(12) United States Patent
Böhm et al.

(10) Patent No.: US 10,737,594 B2
(45) Date of Patent: Aug. 11, 2020

(54) FOOT PROP FOR A CHILD SAFETY SEAT

(71) Applicant: BRITAX RÖMER KINDERSICHERHEIT GMBH, Leipheim (DE)

(72) Inventors: Martin Böhm, Blaustein (DE); Martin Haas, Steinheim (DE)

(73) Assignee: Britax Römer Kindersicherheit GmbH, Leipheim (DE)

( * ) Notice: Subject to any disclaimer, the term of this patent is extended or adjusted under 35 U.S.C. 154(b) by 29 days.

(21) Appl. No.: 16/129,868

(22) Filed: Sep. 13, 2018

(65) Prior Publication Data
US 2019/0077281 A1    Mar. 14, 2019

(30) Foreign Application Priority Data
Sep. 14, 2017  (EP) .................................... 17001534

(51) Int. Cl.
*B60N 2/42*    (2006.01)
*B60N 2/26*    (2006.01)
(Continued)

(52) U.S. Cl.
CPC .......... *B60N 2/2824* (2013.01); *B60N 2/289* (2013.01); *B60N 2/2827* (2013.01);
(Continued)

(58) Field of Classification Search
CPC ........................... B60N 2/2824; B60N 2/2821
See application file for complete search history.

(56) References Cited

U.S. PATENT DOCUMENTS 4,215,900 A * 8/1980 Coult .................. B60N 2/2821
                                                        297/216.11
4,480,870 A * 11/1984 von Wimmersperg .....................
                                                        B60N 2/2809
                                                        297/216.11
(Continued)

FOREIGN PATENT DOCUMENTS

DE    202013103189 U1    11/2013
EP         1090804 B2     3/2007
(Continued)

OTHER PUBLICATIONS

Extended Search Report and Written Opinion of corresponding European application No. 17001534.1 dated Mar. 13, 2018, all enclosed pages cited.

*Primary Examiner* — Shin H Kim
(74) *Attorney, Agent, or Firm* — Burr & Forman, LLP

(57) ABSTRACT

The invention relates to a foot prop adapted to be attached to a child safety seat, comprising an elongate component, comprising an upper portion and a lower portion, wherein the lower portion is slidable relative to the upper portion in longitudinal direction of the elongate component. The foot prop is configured such that a force applied in the longitudinal direction causes the lower portion to automatically move away from the upper portion whenever the force exceeds a predetermined threshold, so that the length of the elongate component is increased; and the foot prop is configured such that the lower and the upper portion are releasably blocked against relative movement towards one another. The invention further relates to a seat base and a child safety seat comprising a foot prop.

14 Claims, 5 Drawing Sheets

(51) Int. Cl.
*B60N 2/28* (2006.01)
*B60N 2/427* (2006.01)
*B60N 3/06* (2006.01)

(52) U.S. Cl.
CPC ......... *B60N 2/2842* (2013.01); *B60N 2/2854* (2013.01); *B60N 2/2863* (2013.01); *B60N 2/2884* (2013.01); *B60N 2/42736* (2013.01); *B60N 3/063* (2013.01)

(56) References Cited

U.S. PATENT DOCUMENTS

| | | | | |
|---|---|---|---|---|
| 7,441,733 | B2* | 10/2008 | Chen | B60N 2/2824 |
| | | | | 248/125.8 |
| 8,973,987 | B2* | 3/2015 | Mo | B60N 2/2824 |
| | | | | 297/216.11 |
| 9,849,812 | B2* | 12/2017 | Cheng | B60N 2/2809 |
| 2008/0030052 | A1* | 2/2008 | Chen | B60N 2/2824 |
| | | | | 297/188.02 |
| 2008/0224516 | A1* | 9/2008 | Vegt | B60N 2/2824 |
| | | | | 297/256.16 |
| 2008/0303321 | A1* | 12/2008 | Powell | B60N 2/2824 |
| | | | | 297/216.11 |
| 2008/0315647 | A1* | 12/2008 | Carine | B60N 2/2824 |
| | | | | 297/250.1 |
| 2009/0102257 | A1* | 4/2009 | Collias | B60N 2/2806 |
| | | | | 297/256.16 |
| 2012/0319442 | A1* | 12/2012 | Clement | B60N 2/2821 |
| | | | | 297/216.11 |
| 2014/0001800 | A1* | 1/2014 | Mo | B60N 2/2884 |
| | | | | 297/216.11 |
| 2014/0327281 | A1* | 11/2014 | Hou | B60N 2/2821 |
| | | | | 297/217.1 |
| 2015/0137575 | A1* | 5/2015 | Millasseau | B60N 3/063 |
| | | | | 297/423.38 |
| 2016/0318425 | A1* | 11/2016 | Hjerpe | B60N 2/2824 |
| 2018/0236905 | A1* | 8/2018 | Gebhardt | B60N 2/2812 |
| 2019/0031052 | A1* | 1/2019 | Pos | B60N 2/286 |
| 2019/0077281 | A1* | 3/2019 | Bohm | B60N 2/2824 |

FOREIGN PATENT DOCUMENTS

| | | |
|---|---|---|
| EP | 3088242 A1 | 11/2016 |
| WO | 2005123447 A1 | 12/2005 |

* cited by examiner

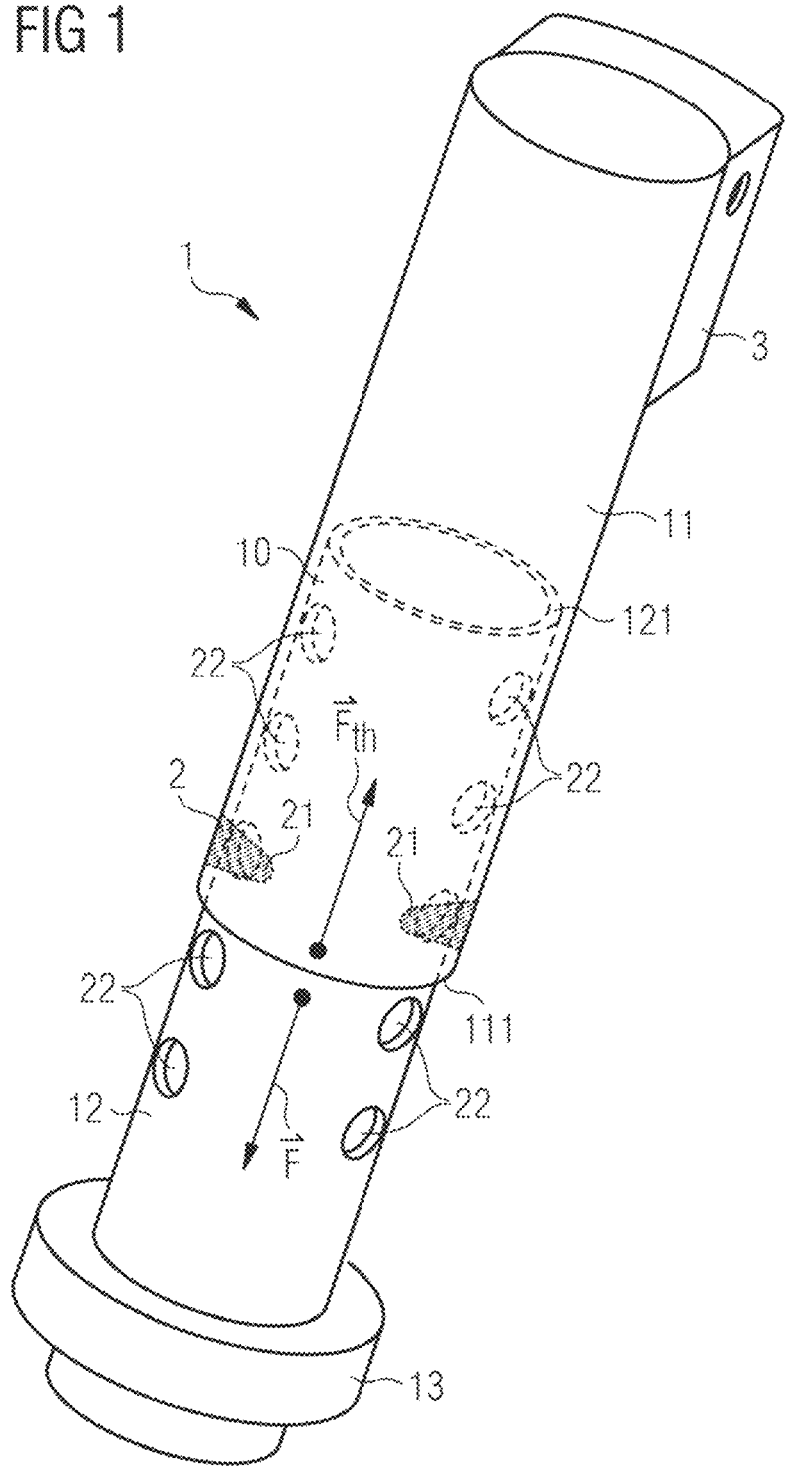

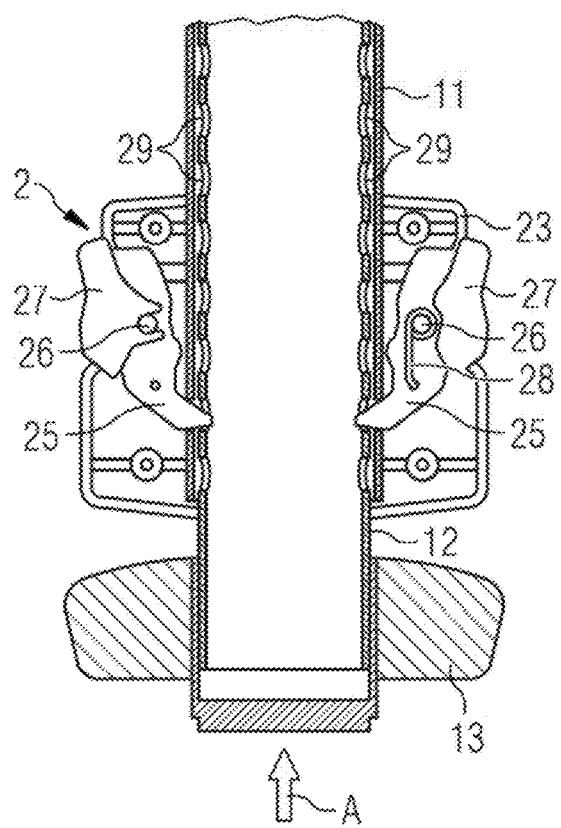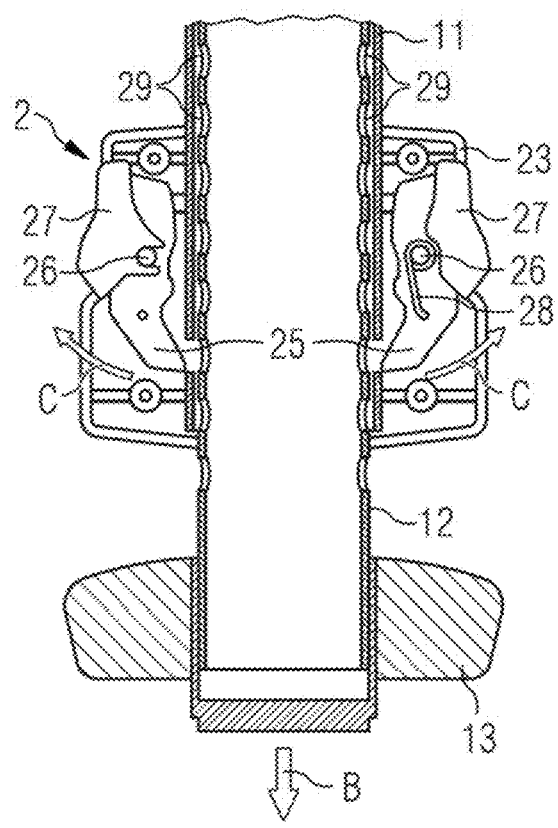

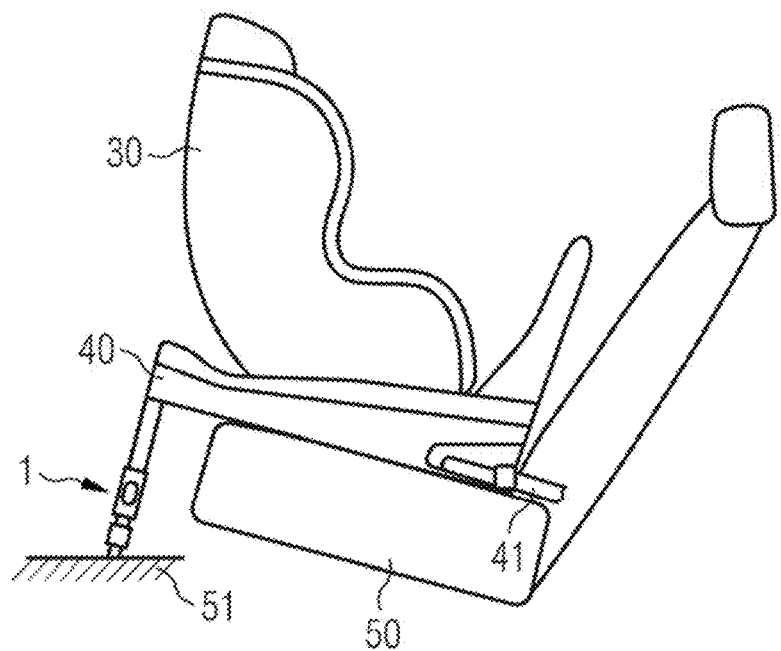
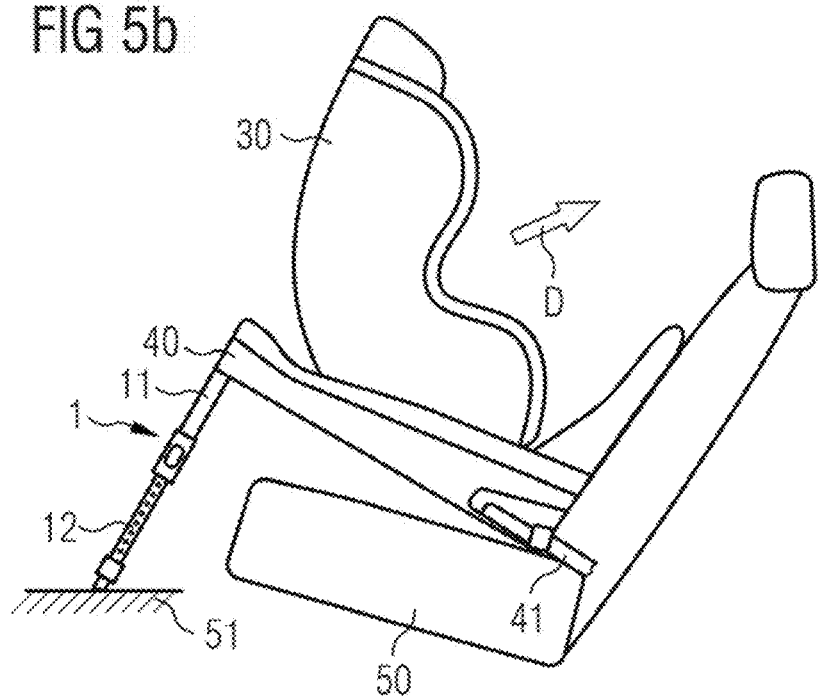

FOOT PROP FOR A CHILD SAFETY SEAT

This application claims priority to European application number 17001534.1 filed Sep. 14, 2017, the entire contents of which are hereby incorporated by reference in its entirety.

The invention relates to a foot prop for a child safety seat, a seat base comprising such a foot prop and a child safety seat comprising such a foot prop or such a seat base. In particular, the invention relates to a self-extending foot prop and its use with a seat base of a child safety seat or with a child safety seat.

Children, until they have reached a certain age or height, may not be secured in vehicles with the seat belts of the vehicle. Because of this, child safety seats must be used for safely transporting children in a vehicle. Smaller children, such as babies or toddlers, are held firmly in their safety seat mounted on a passenger seat of a vehicle with a special child restraint system, such as an integral harness system. For this age group, a safety seat with a 3-point or 5-point harness using a harness buckle as a coupling device is the safest way to travel. The 3-point or 5-point harness of the safety seat firmly secures shoulders and hips of the child in the seat.

Typically, child safety seats are mounted on a seat of the vehicle. The child safety seats are either secured by using the vehicle's seat belt, or by anchoring the child safety seat on the vehicle seat by using a particular anchoring mechanism, such as an Isofix system.

When using anchoring mechanisms, such as Isofix, the child safety seat is attached by means of rigid links or latches to respective anchorage units of the vehicle seats, such as loop mountings fixed in the vehicle. These anchoring mechanisms generally employ two anchorage units. The anchorage units, thus, define a lateral axis of the vehicle. As a consequence, a child safety seat mounted by means of such an anchoring mechanism, e.g., an Isofix system, tends to rotate about said lateral axis.

The rotation of the child safety seat about the above-mentioned lateral axis might provide a severe danger and risk of injuries for the child being secured in the child safety seat in the event of both a frontal collision or a rear-end collision. For instance, a rear-end collision may cause the child safety seat to first rise from the vehicle seat and then to bounce back to its original position. The larger the force or energy of the impact is, the higher the child safety seat rotates about the lateral axis, and the higher the fall back is. As a consequence, the child is affected by high accelerations both in the rise from as well as in the fall back to the vehicle seat. In the case of a frontal collision, the child safety seat is also forced to rotate about the lateral axis, thereby being pressed downwards in the vehicle seat. With a forward facing child safety seat, the child sitting in the child safety seat, thus, experiences two rotations: the first is the tilting of the child's body because of the force acting on it, the second stems from the rotation of the child safety seat about the lateral axis down into the vehicle seat. Because of this, the child may be rotated forwards to such an extent that he/she, specifically his/her head, hits the back of a front vehicle seat.

Different mechanisms for dealing with the unwanted rotation about the lateral axis defined by the, e.g., Isofix, anchorage units exist. One such mechanism is the so-called top tether. This mechanism comprises a tether and a rigid point in the vehicle body. The tether connects the rigid point to the top of the child safety seat, thereby preventing forward movement of the child safety seat relative to the vehicle seat in the case of a collision.

Another mechanism for dealing with the rotation is the so-called "Isofix Pivoting Link", to which European patent no. 1 090 804 is directed. The mechanism using the Isofix pivoting link operates to control the movement of the child safety seat so that forward and rotational movement thereof is translated at least in part into (translatory) downward movement of the child safety seat into the vehicle seat. Thus, this mechanism reduces the overall tilting angle of the child in a frontal impact.

A third mechanism for suppressing the rotation of the child safety seat about the lateral axis is given by a foot prop. A foot prop or a support leg for a child safety seat is a means to prevent the rotation of the child safety seat about the lateral axis in case of an impact. Typically, the foot prop is attached to the front end of a seat base for a child safety seat. The seat base may be attached by Isofix links at its rear end to the corresponding anchorage units of the vehicle. The front end of the seat base with the attached foot prop may extend off the vehicle seat. The foot prop supports the seat base against being pressed downward into the vehicle seat in the case of a frontal accident.

Known foot props are, however, not able to attenuate the bounce or fall back of the child safety seat in the case of a rear-end collision. Known foot props are adjustable in length to fit the different floor heights in the vehicle. Generally, however, the user of a child safety seat has to set the foot prop to the correct length by deliberate action. Once the user has set the length of the foot prop, it remains fixed. Because of this, the height of the bounce or fall back in the case of a rear-end collision is not substantially attenuated by the use of a known foot prop. In addition, since the length of the foot prop needs to be set by the user, there exists a misuse potential. For instance, the user might forget to adjust the length of the foot prop or the user might set the length of the foot prop incorrectly.

It is, thus, an object of the present invention to provide a foot prop to be used with a child safety seat which reduces the risk of injury for a child secured in the child safety seat in the case of a rear impact, and which, in addition, prevents a user from misuse of the foot prop.

This object is achieved by the foot prop according to claim 1, by the seat base according to claim 8, and by the child safety seat according to claims 11 and 12. Further advantageous embodiments of the present invention are indicated in claims 2 to 7, 9 to 10, and 13, 14.

According to a first aspect of the invention there is provided a foot prop adapted to be attached to a child safety seat, comprising an elongate component the length of which is extendable between a minimal length and a maximal length. The elongate component comprises an upper portion and a lower portion, wherein the lower portion is slidable relative to the upper portion in longitudinal direction of the elongate component. The foot prop is configured such that a force applied in the longitudinal direction to the lower portion causes the lower portion to automatically move away from the upper portion whenever the force exceeds a predetermined threshold, so that the length of the elongate component is increased. The foot prop is further configured such that the lower portion and the upper portion are releasably blocked against relative movement towards one another upon exertion of a force in the longitudinal direction of the elongate component.

Since the lower portion of the elongate component of the foot prop is allowed to automatically move away from the upper portion of the elongate component whenever a force exceeding a predetermined threshold is applied in longitudinal direction to it, the length of the elongate component may increase without user interaction. The increase of the elongate component's length implies the increase of the foot prop's length. Depending on the chosen predetermined threshold, the required applied external force for increasing the elongate component's length may be chosen. Preferably, the threshold is given by a force smaller than the force of gravity of the lower portion. The gravitational force of a body is sometimes also referred to as the body's weight. It is also possible that the threshold is set to zero.

Setting the predetermined threshold to a value lower than the force of gravity of the lower portion has the advantage that the lower portion moves away from the upper portion when the foot prop is attached to a seat base of a child safety seat and brought into a substantially vertical position. Therefore, when the seat base is not accelerated, there is no net force applied to the upper portion, i.e., in this case, the total forces exerted on the upper portion are zero. Further, still in the case described before, i.e., when the foot prop is brought in a substantially vertical position and attached to the seat base, the force applied to the lower portion is the force of gravity. When the predetermined threshold is smaller than the force of gravity of the lower portion, the lower portion moves away from the upper portion, caused by the exertion of the force of gravity on the lower portion.

The lower portion may automatically move away from the upper portion until it reaches an end stop of the foot prop. In this case, the elongate component has been extended up to its maximal length. Furthermore, when the foot prop is attached to a seat base and installed on a vehicle seat, the lower portion, when moving away from the upper portion because of the gravitational force, may be stopped by the floor of the vehicle. In this case, the elongate component is partially extended, i.e., it has not yet reached its maximal length. Using a predetermined threshold smaller than the gravitational force of the lower member has, thus, the advantage that no user interaction is necessary for setting the correct length of the foot prop when a seat base with attached foot prop is installed on a vehicle seat. Misuse by the user is, thus, prevented.

The predetermined threshold is advantageously determined for the lower portion with respect to the upper portion kept at rest. This is equivalent to say that the predetermined threshold is the minimal force necessary for moving the lower portion away from the upper portion held at rest, if no other external forces act on the foot prop. Furthermore, a force applied in one direction to the lower portion is equivalent to a respective force applied in the opposite direction to the upper portion. That is, the threshold may be defined with regard to the lower portion without loss of generality. In other words, defining the threshold with regard to the upper portion at rest does not necessarily imply that the foot prop of the invention functions only if the force applied to the lower portion exceeds the predetermined threshold. Because of the structure of the elongate component, a corresponding effect may be achieved by applying a respective force on the upper portion, pulling the upper portion away from the lower portion, or by applying external forces to both the upper portion and the lower portion so that a resulting force larger than the predetermined threshold causes the upper portion and the lower portion to move away from one another.

Furthermore, since the lower portion and the upper portion are releasably blocked against relative movement towards one another upon exertion of a force in the longitudinal direction of the elongate component it is prevented that the length of the foot prop is unintentionally shortened. Since an automatic shortening of the foot prop is not possible in accordance with the invention, the foot prop keeps the length it is extended to. This is particularly advantageous in the case of a rear impact. When the foot prop is attached to the seat base of a child safety seat, and if the predetermined threshold is adequately chosen, in the case of a rear impact causing the child safety seat to rotate upward with regard to the vehicle seat, the elongate component of the foot prop will increase its length during the upward rotation. Once the maximum rise or height during rotation has been reached, the foot prop will keep the respective length or extension. Any force applied in longitudinal direction to the foot prop or the longitudinal component may not be able to move the upper portion closer towards the lower portion of the elongate component. The elongate component and, thus, the foot prop, keeps it extension.

"Any force" refers to any reasonable force that might occur during the accident of a vehicle. Because of this, the child safety seat, after a rotation caused by, e.g., a rear impact, may maintain a raised position. This raised position is, advantageously, given by the maximal possible extension of the foot prop or the maximal extension of the foot prop reached during the rotation of the child safety seat. The child safety seat is, thus, prevented from bouncing back or falling back onto the vehicle seat.

Since the blocking of the upper portion and lower portion against relative movement towards one another is releasable, it is guaranteed that the length of the foot prop may, after extension, be only deliberately reduced.

Advantageously, the predetermined threshold corresponds to a force smaller than the force of gravity of the lower portion.

In accordance with the invention, however, it is also possible that the predetermined threshold corresponds to a force larger than the force of gravity of the lower portion. This setting has the advantage that the foot prop, attached to a seat base of a child safety seat, does not automatically extend once brought into a substantially vertical position. With the predetermined threshold being set larger than the gravitational force of the lower portion, a force additional to the force of gravity needs to be applied to the lower portion for it to move away from the upper portion. When the foot prop is attached to the seat base of a child safety seat and installed on a vehicle seat, the equivalent effect of applying a force larger than the predetermined threshold on the lower portion can be achieved if a respective force is applied to the upper portion. A force applied to the upper portion is equivalent to a force of inertia affecting the lower portion. Such a force might arise, e.g., during an impulse caused in a vehicle impact.

Preferably, the foot prop further comprises a length adjustment mechanism with an actuator operable to adjust the length of the elongate component, wherein the length adjustment mechanism is configured to block the lower portion and the upper portion of the elongate component against relative movement towards one another, when the actuator is not operated. Advantageously, only upon operation of the length adjustment mechanism it is possible to shorten the length of the elongate component of the foot prop. In other words, the blocking of the lower portion and the upper portion against relative movement towards one another is released upon operation of the actuator. Preferably, the operation has to be done by a user. If not operated, the length adjustment mechanism prevents the length of the foot prop from being shortened. Further, if not operated, the length adjustment mechanism allows for extending the length of the foot prop if a force exceeding the predetermined threshold is applied in longitudinal direction to the lower portion of the elongate component.

Advantageously, the length adjustment mechanism comprises a ratchet mechanism coupled to either one of the upper portion or the lower portion of the elongate component, and the ratchet mechanism is adapted to engage with a receiving element of the other one of the lower portion or the upper portion of the elongate component. Preferably, the ratchet mechanism comprises an engaging member, the receiving element is adapted to receive at least a portion of the engaging member, and the length adjustment mechanism is configured such that the engaging member is forced deeper into the receiving element upon exertion of a force in the longitudinal direction of the elongate component driving the upper portion and the lower portion towards one another. Preferably, the ratchet mechanism comprises more than one engaging members. Preferably, the ratchet mechanism is coupled to the upper portion and the receiving element is coupled to the lower portion. Preferably, the engaging members comprise ratchets. Preferably, the receiving elements comprise holes, openings, or protruding elements such as bolts or teeth. Owing to the ratchet mechanism it is possible for the length adjustment mechanism to fulfil the functionality of the foot prop in accordance with the invention. The ratchet mechanism guarantees that movement of the lower portion towards the upper portion is precluded. Furthermore, the ratchet mechanism allows for movement of the lower portion away from the upper portion if a force is applied to the lower portion exceeding a predetermined threshold. The predetermined threshold is preferably determined by choosing an appropriate locking force of the ratchets. The locking force of the ratchets is the force with which the ratchets are driven into the holes or openings of the receiving element of the lower portion.

Advantageously, the foot prop further comprises an activation mechanism configured, when activated, to block the upper portion and the lower portion against relative movement away from one another so as to prevent length increase of the elongate component; and configured, when disabled, to allow for movement of the lower portion away from the upper portion. The activation mechanism may be used to block length adjustment of the foot prop in either direction. Such a blocking is particularly advantageous if the foot prop is attached to the seat base of a child safety seat, and if the child safety seat is transported or carried outside the vehicle. In such a situation, it is advantageous that the foot prop does not automatically extend. Therefore, the activated activation mechanism facilitates the handling of a child safety seat with the foot prop of the invention whenever the child safety seat is not placed on the vehicle seat.

Length adjustment of the foot prop may be possible only after disabling the activation mechanism. The activation mechanism is, preferably, disabled once the child safety seat with the foot prop is installed on the vehicle seat. It is further advantageous if the disablement of the activation mechanism occurs automatically. It is, however, also possible that the activation mechanism is configured to be manually disabled. Preferably, the activation mechanism is part of the length adjustment mechanism. It is also possible that the activation mechanism is adapted to control the length adjustment mechanism. Preferably, the activation mechanism is configured, when activated, to lock the length adjustment mechanism such that length adjustment of the elongate component is precluded; preferably, the activation mechanism is configured, when disabled, to allow for length adjustment of the foot prop by the length adjustment mechanism.

Moreover, it is preferable that the activation mechanism further comprises an expulsion mechanism adapted to expel the lower portion away from the upper portion upon disablement of the activation mechanism. For this, the expulsion mechanism advantageously comprises an elastic element such as a spring. The expulsion mechanism ensures that the foot prop extends more quickly and more reliably.

Advantageously, the foot prop further comprises a sensing means adapted to sense a force exerted on the foot prop or on another component of the child safety seat, wherein the sensing means is coupled to the activation mechanism such that a force sensed by the sensing means lying above a second predetermined threshold causes the disablement of the activation mechanism. In this case, the length adjustment of the foot prop or the elongate component is controlled by the sensing means. The second predetermined threshold may be the same as the predetermined threshold related to the force applied to the lower portion. It is, however, preferable if the second threshold differs from the predetermined threshold for the lower portion. It is particularly advantageous if the predetermined threshold for the lower portion is set to a value lower than the force of gravity of the lower portion, and if the second predetermined threshold is set to a non-zero value. Preferably, in this case, the second predetermined threshold is given by a force characteristic to forces arising in a rear impact. Because of this, in the previously described configuration, in the case of a rear impact, the activation mechanism is disabled as long as the force exceeds the second predetermined threshold. This allows for extension of the foot prop under the force of gravity exerted on the lower portion. In this case the extension of the foot prop is actively triggered by the sensing means. The sensing means is advantageously an acceleration sensor.

According to a second aspect of the invention, there is provided a seat base for a child safety seat comprising a foot prop in accordance with the invention. The seat base can either be an integral part of the child safety seat, or a separate part of the child safety seat. Advantageously, the upper portion of the elongate component is pivotally attached to the seat base. The advantages of the seat base correspond to those described above in relation to the foot prop. If the upper portion is pivotally attached to the seat base, lateral adjustment of the foot prop is facilitated.

Advantageously, the seat base further comprises a pair of rigid links projecting from the seat base, wherein each of the rigid links has a releasable connector and is adapted to be engaged with respective anchorage units provided in a vehicle seat. Preferably, the foot prop comprises an activation mechanism, and the activation mechanism and the rigid links are coupled such that the activation mechanism is disabled when the rigid links engage with the anchorage units of the vehicle seat. It is further advantageous if the coupling between the activation mechanism and the rigid links is such that the activation mechanism is activated upon disengaging the rigid links from the respective anchorage units. Preferably, the rigid links are Isofix connectors. Preferably, the coupling between the activation mechanism and the rigid links comprises a flexible cable, preferably a Bowden cable. The coupling of the activation mechanism and the rigid links has the advantage that the foot prop may extend to the correct length once the seat base is correctly installed on the vehicle. Before installation on the vehicle, the foot prop is, however, prevented from automatically extending. Thus, not only installation of the seat base is facilitated and misuse is avoided, but also the transportation and carrying of the seat base outside the vehicle is facilitated.

According to a third aspect of the invention there is provided a child safety seat comprising a foot prop, wherein the foot prop comprises an elongate component the length of which is extendable between a minimal length and a maximal length. The elongate component comprises an upper portion and a lower portion, wherein the lower portion is slidable relative to the upper portion in longitudinal direction of the elongate component. The foot prop is configured such that the lower portion automatically moves away from the upper portion, so that the length of the elongate component is increased, when the child safety seat is installed on a seat of a vehicle and when an impact during a collision of the vehicle causes the child safety seat to rise from the seat of the vehicle. Preferably, the foot prop is further configured such that the elongate component is releasably blocked at its increased length after the impact.

Preferably, the child safety seat further comprises a seat base, wherein the foot prop is coupled to the seat base.

It is understood that the foot prop of the child safety seat may comprise any advantageous or preferable features described above in relation to the foot prop and/or the seat base of the invention or any combination of said features.

The advantages are the same as those described above in relation to the foot prop or the seat base.

Specific embodiments of the invention will now be described by way of example and with reference to the accompanying drawings, in which:

FIG. 1 shows a foot prop in accordance with the invention and its basic functioning principle;

FIG. 3a shows a sectional view of the foot prop and sketches the functioning of the length adjustment mechanism of FIGS. 2a and 2b for the case that it is tried to shorten the length of the foot prop;

FIG. 3b shows a sectional view of the foot prop and sketches the functioning of the length adjustment mechanism of FIGS. 2a and 2b for case that the length of the foot prop is increased;

FIGS. 5a and 5b show the functioning of the foot prop according to the invention attached to a child safety seat in the event of a rear-end collision of the vehicle.

Figure 2A:
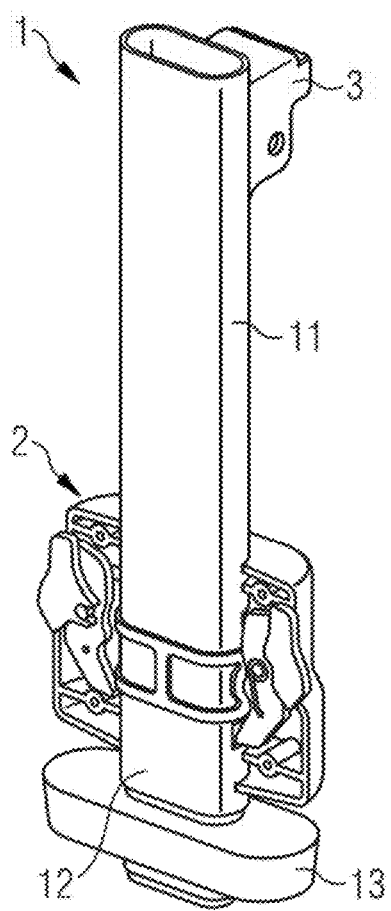
FIG. 2a shows a further embodiment of the foot prop in accordance with the invention comprising a length adjustment mechanism.

FIG. 1 shows a foot prop 1 in accordance with the invention. More specifically, FIG. 1 shows the elongate component 10 of the foot prop, a foot component 13, a length adjustment mechanism 2 and an attachment means 3. The elongate component 10 comprises an upper portion 11 and a lower portion 12. The lower portion 12 is slidably mounted in the upper portion 11. The lower portion 12 is slidable along the longitudinal direction of the elongate component 10. The upper portion 11 may comprise an outer tube, the lower portion 12 may comprise an inner tube. Furthermore, the upper portion 11 comprises a respective flange 111; the lower portion 12 comprises a respective flange 121. The flanges 111 and 121 serve to provide a stop for the lower portion 12 moving away from the upper portion 11. That is, the maximal extension of the lower portion 12 is given when the flange 121 of the lower portion 12 abuts against the flange 111 of the upper portion 11. In this case, the elongate component 10 has reached its maximal length. Then, the foot prop 1 has also reached its maximal length. The foot component 13 provides stability to the foot prop 1 when placed in a vehicle, specifically, when extended to the floor of the vehicle. In addition, the foot component 13 serves also as a stop for the lower portion 12 when the lower portion 12 is moved towards the upper portion 11, i.e., when the length of the elongate component 10 or, equivalently, when the length of the foot prop 1 is shortened.

The length adjustment mechanism 2 comprises two teeth 21. The teeth 21 are adapted to engage with holes 22 in the lower portion 12. The holes 22 may be considered as receiving elements. The teeth 21 of the length adjustment mechanism 2 possess a wedge shape. The wedge shape of the teeth 21 is such that a movement of the lower portion 12 away from the upper portion 11 is possible by applying a certain force to the lower portion 12, facing a way from the upper portion 11. The teeth 21 are, further, shaped such that a movement of the lower portion 12 towards the upper portion 11 upon application of a force to the elongate component 10, that is, either on the upper portion 11 or the lower portion 12, is not possible. In order for the lower portion 12 to be allowed to move towards the upper portion 11, the length adjustment mechanism 2 has to be operated. There might, for instance, be provided an actuator, such as a button, (not shown) at the outside of the upper portion 11, which, upon operation, causes the teeth 21 to retract from their extended position. Upon operation of the length adjustment mechanism 2, the lower portion 12 may be moved towards the upper portion 11. By this, the length of the foot prop is shortened.

The upper portion 11 comprises at its upper end an attachment means 3. The attachment means 3 allows for attachment of the foot prop 1 to a child safety seat, preferably, to the seat base of a child safety seat, particularly preferably, to the front side of the seat base. The attachment means 3 may be configured such that the foot prop is pivotally attached to the child safety seat or its seat base.

FIG. 1 shows also the forces relevant for the functioning of the foot prop of the invention. Fth is a predetermined threshold. This is a force which links the upper portion 11 and the lower portion 12 together. In FIG. 1, a general force is depicted for the sake of readability. The predetermined threshold Fth may, however, have several contributions. For instance, in the embodiment shown in FIG. 1 one of said contributions may be a frictional force because of the sliding of the lower portion 12 inside the upper portion 11. Furthermore, the teeth 21 engaging with the holes 22 of the lower portion 12 exert also a force on the lower portion 12. The threshold Fth may be predetermined by choosing factors influencing the forces contributing to the threshold Fth accordingly. For instance, in the example given above, the frictional coefficient of the upper portion 11 and the lower portion 12 may be varied; the modulus of elasticity of the teeth 21 may be varied; and many other factors are possible. In order for the lower portion 12 to be moved away from the upper portion 11, a longitudinal force F needs to be applied to the lower portion 12 which has at least the same magnitude as the predetermined threshold Fth. Based on this, the predetermined threshold Fth can also be defined as the minimal force that needs to be applied to the lower portion 12 for it to move away from the upper portion 11.

In order to provide an unambiguous definition of the predetermined threshold Fth, it is understood that the before mentioned minimal force is determined under the condition that the upper portion 11 is kept at rest and that no other external forces, such as gravity, act on the foot prop. This does, however, not necessarily imply that the foot prop of the invention functions only if the force applied to the lower portion 12 (as exemplarily shown by the force F in FIG. 1) exceeds the predetermined threshold. Because of the structure of the elongate component, a corresponding effect may be achieved by applying a respective force on the upper portion 11, pulling the upper portion 11 away from the lower portion 12, or by applying external forces to both the upper portion 11 and the lower portion 12 so that a resulting force larger than the predetermined threshold Fth causes the upper portion 11 and the lower portion 12 to move away from one another.

The (magnitude of the) predetermined threshold Fth may be chosen or set by varying several factors when constructing the foot prop, as described above. In principle, the predetermined threshold may be set to any positive number or even to zero. If the predetermined threshold Fth is set smaller than the force of gravity of the lower portion 12, then the lower portion 12 may automatically move away from the upper portion 11 under the force of gravity, provided the upper portion 11 is, e.g., fixed in space. In other words, for Fth smaller than the force of gravity of the lower portion 12, the foot prop 1 when used in substantially vertical position and attached to a child safety seats, extends automatically either to its maximal length, or when used on a vehicle seat, it extends automatically until it reaches the floor of the vehicle. This will be further described below with respect to FIGS. 4a and 4b.

The predetermined threshold Fth may, however, also be set to a magnitude larger than the force of gravity of the lower portion 12. In this case, assuming the foot prop 1 is placed in substantially vertical position, a force contribution in addition to gravity is necessary for moving the lower portion 12 away from the upper portion 11, thereby extending the length of the foot prop 1, or, equivalently, the length of the elongate component 10. Such an additional force necessary for moving the lower portion 12 away from the upper portion 11 (or vice versa) may be exerted during an impact of a vehicle accident. This will be further described below with respect to FIGS. 5a and 5b. The advantage of choosing the predetermined threshold Fth larger than the force of gravity of the lower portion 12 is that, when the foot prop 1 is substantially vertically placed, the foot prop 1 does not extend under the bare force of gravity, but, e.g., under exceptional conditions, such as a vehicle accident. The foot prop 1, thus, automatically extends whenever the exceptional condition is fulfilled. On the other hand, this prevents that the foot prop 1 extends when the child safety seat, to which it may be attached, is carried or installed.

FIG. 2a shows a foot prop 1 in accordance with a second embodiment of the invention. The foot prop 1 of this embodiment differs from that shown in FIG. 1 by the structure of the length adjustment mechanism 2. The same as in FIG. 1, the foot prop 1 comprises an elongate component with an upper portion 11 and a lower portion 12. There is a foot component 13 coupled to the lower end of the lower portion 12. Furthermore, an attachment means 3 for attaching the foot prop 1 to a seat base of a child safety seat is also shown. With regard to the description of the components which are the same as described with respect to FIG. 1, reference is made to the description of FIG. 1.

Figure 2B:
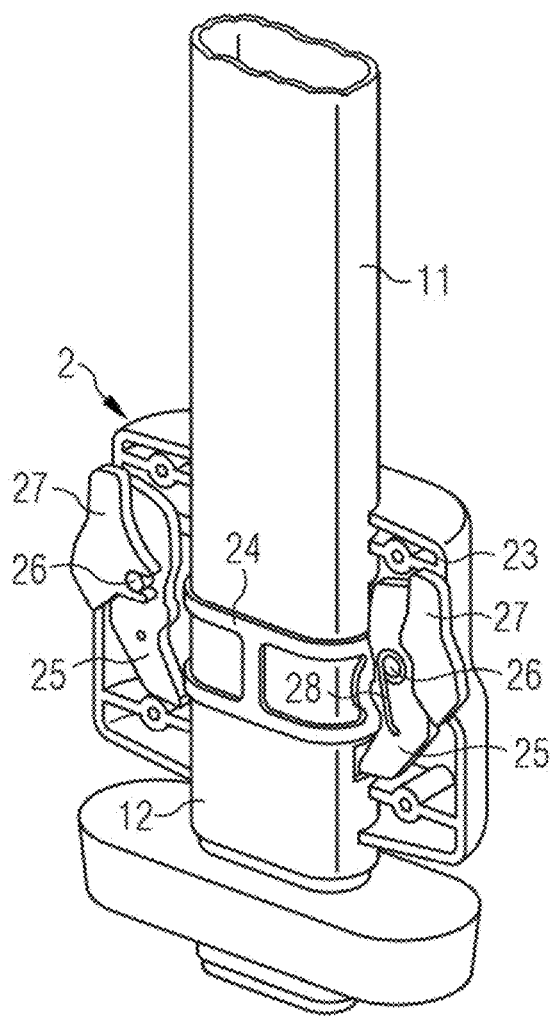
FIG. 2b is a more detailed view of FIG. 2a showing the structural components of the length adjustment mechanism.

The length adjustment mechanism 2 of the second embodiment is shown in detail in FIG. 2b. In FIG. 2b, there is shown a length adjustment mechanism 2 which comprises a housing 23 (where in FIG. 2b only the back part is shown for reasons of visibility), two metal brackets 24, two engaging members 25, two pins 26, two actuators 27, and two elastic elements 28. In the embodiment shown in FIG. 2b, the engaging members are formed as ratchets 25, the actuators are formed as buttons 27, and the elastic elements are formed as springs 28, preferably leg springs, compression springs or tension springs. Said components are not limited to the given specific forms. The engaging members 25, the pins 26, the actuators 27 and the elastic elements 28 are part of a ratchet mechanism. The two metal brackets 24 are adapted to attach the length adjustment mechanism 2 to the upper portion 11. The engaging members 25 are configured to engage with respective receiving elements (not shown in FIG. 2b) of the lower portion 12. The functioning of the length adjustment mechanism 2 of the second embodiment will be described in the following with regard to FIGS. 3a and 3b.

FIG. 3a shows the length adjustment mechanism 2 of the second embodiment shown already in FIGS. 2a and 2b in a cross-sectional view when seen from the front. In FIG. 3a there are shown the upper portion 11 and the lower portion 12 of the elongate component of the foot prop, the foot component 13 coupled to the lower portion 12, and the length adjustment mechanism 2. The length adjustment mechanism 2 is coupled to the upper portion 11 of the elongate component. For this, e.g., metal brackets as described with respect to FIG. 2b may be used (the metal brackets are not shown in FIG. 3a, but they are denoted by the reference numeral 24 in FIG. 2b). The length adjustment mechanism 2 comprises a housing 23 and a ratchet mechanism. The ratchet mechanism comprises the engaging members 25, the pins 26, the actuators 27 and the elastic elements 28. The details of these components have already been described above with respect to FIG. 2b. The upper portion 11 of the elongate component comprises an outer tube. The lower portion 12 of the elongate component comprises an inner tube. The lower portion 12 further comprises receiving elements 29 adapted to receive the engaging members 25 or at least a portion of the engaging members 25 of the ratchet mechanism, and to engage with the engaging members 25. In FIG. 3a, the receiving elements are formed as several holes 29 or openings in the lower portion 12. Said holes 29 are spaced along the longitudinal axis of the lower portion 12.

FIG. 3a shows the length adjustment mechanism 2 in the locked position. In this position, the engaging members 25 or a portion of the engaging members 25 are received by at least a portion of the receiving elements 29. The engaging members 25 engage with at least a portion of the receiving elements 29. With regard to the particular components of the second embodiment of the invention shown in FIG. 3a, the ratchets 25 are forced into two of the holes 29. The ratchets 25 are driven into engagement with the holes 29 by the elastic elements, e.g., the springs 28.

There exist different scenarios when the length adjustment mechanism 2 is in locked position.

One is given under the following conditions. The predetermined threshold is chosen such as to be smaller than the gravitational force of the lower portion 12 of the elongate component. Such a predetermined threshold can, e.g., be set by choosing the spring constant of the elastic elements 28 of the length adjustment mechanism 2 accordingly. In this case, a force applied to the lower portion 12 which is equal to or larger than the predetermined threshold is sufficient to have the engaging members 25 retracted out of engagement with the engaging elements 29. Therefore, the length of the foot prop extends when a force larger than the predetermined threshold is applied to the lower portion 12. Because of this, specifically, when the foot prop is placed in a vertical position, a counteracting force A is necessary for keeping the lower portion 12 at rest (under the assumption that the upper portion 11 is kept fixed and that the elongate component has not yet been extended to its maximal length). If no such counteracting force A were acting on the lower portion 12, the lower portion 12 would be allowed to move away from the upper portion 11. Such a counteracting force A may, e.g., be provided by the floor of a vehicle when the lower portion 12 touches the floor of the vehicle. The latter situation will be described in more detail below with regard to FIG. 4b. The counteracting force A drives the engaging members 25 into engagement with a subset, e.g., two, of the receiving elements 29. More generally, when any force is applied to the foot prop trying to shorten the length of the foot prop, then this force will be transferred from the lower portion 12 to the engaging members 25 such that the engaging members 25 are driven into engagement with at least a portion of the receiving elements 29. The larger the force exerted in longitudinal direction on the foot prop or the elongate component trying to move the upper portion 11 towards the lower portion 12 is, the stronger the engagement between the engaging members 25 and said receiving elements 29 becomes. This prevents the foot prop from automatic shortening of its length.

More specifically with regard to the components of the foot prop according the second embodiment, any force applied in a direction to shorten the foot prop will be transferred from the inner tube of the lower portion 12 to the ratchets 25. The ratchets 25 are on their part supported by the pins 26. The pins 26 are held by the metal brackets (not visible in FIG. 3a, but denoted by reference numeral 24 in FIG. 2b). The metal brackets are firmly attached to the outer tube of the upper portion 11. The shape of the ratchets 25 and the position of the pins 26 are designed in a way that under a load in longitudinal direction and trying to move the upper portion 11 towards the lower portion 12, the ratchets 25 will be forced deeper into the holes 29.

A second scenario when the length adjustment mechanism 2 is in the locked position is given as follows. The predetermined threshold is chosen such as to be larger than the gravitational force of the lower portion 12 of the elongate component. Such a predetermined threshold can, e.g., be set by choosing the spring constant of the elastic elements 28 of the length adjustment mechanism 2 accordingly. In this case, a force applied to the lower portion 12 which is equal to or larger than the predetermined threshold is sufficient to have the engaging members 25 retracted out of engagement with the receiving elements 29. Therefore, the length of the foot prop automatically extends when a force larger than the predetermined threshold is applied to the lower portion 12. Because of this, specifically, when the foot prop is placed in a vertical position, no counteracting force is necessary for keeping the lower portion 12 at rest. Therefore, in this scenario, the length adjustment mechanism 2 is in the locked position even when the gravitational force acts on the lower portion 12.

For this second scenario, the same as described above in relation to the first scenario, the length adjustment mechanism 2 prevents the shortening of the foot prop's length whenever a force is applied in longitudinal direction on the foot prop trying to move the upper portion 11 closer to the lower portion 12.

Independently of which scenario is considered, for the second embodiment in general, to reduce the length of the foot prop, an actuator 27 has to be operated. In particular, upon operation of the actuator 27, the lower portion 12 of the elongate component may be moved towards the upper portion 11. In variants of the embodiment with the predetermined threshold set to a value larger than the gravitational force of the lower portion 12, it might also be beneficial to operate the actuator 27 for extending the length of the foot prop.

Specifically with respect to the components of the second embodiment, for shortening the length of the foot prop, a user has to push the two buttons 27 of the actuator to release the ratchets 25.

FIG. 3b shows the length adjustment mechanism 2 in unlocked position. The structural components are the same as those described above in relation to the FIG. 3a and to which reference is made to.

FIG. 3b shows the functioning of the length adjustment mechanism 2 for extending the length of the elongate component or, equivalently, of the foot prop. The extension of the foot prop is caused by the lower portion 12 moving away from the upper portion 11. For this, a force B equal to or larger than the predetermined threshold needs to be applied to the lower portion 12. As described above in relation to FIG. 3a the predetermined threshold may be set by choosing the material constants, such as friction coefficients, spring constants, elasticity modules, and the dimensions of the elastic elements 28, the engaging members 25 and the receiving elements 29 accordingly. A force B larger than the predetermined threshold applied to the lower portion 12 causes the engaging members 25 to move out of engagement with the receiving elements 29, indicated by arrows C in FIG. 3b. That is, the force B applied to the lower portion 12 may be transferred from the lower portion 12 to the engaging members 25, having the engaging members 25 disengage from the receiving elements 29. As long as the force B applies to the lower portion 12, the lower portion 12 is allowed to move away from the upper portion 11 (if the case may be, until the elongate component reaches its maximal length). As soon as the direction of the force on the lower portion reverses, the engaging members 25 get back into engagement with the receiving elements 29. That is, the length adjustment mechanism 2 returns into locked position, again.

The predetermined threshold may be smaller than the force of gravity of the lower portion 12 (cf. scenario one described above with respect to FIG. 3a). In this scenario, the foot prop may automatically extend under the force of gravity until it reaches its correct length. If the predetermined threshold is chosen larger than the force of gravity then a contribution in addition to the force of gravity is necessary for automatically extending the length of the foot prop. Such an additional contribution may, e.g., be provided by an impulse exerted on the foot prop during an impact in a vehicle accident which is equivalent to an additional force of inertia affecting the lower portion 12. This additional force of inertia plus the force of gravity might then be larger than the predetermined threshold causing the extension of the length of the foot prop. It is also possible that a user provides for the additional force, e.g., by pulling with a respective force on the lower portion 12. These different scenarios will be further addressed below with respect to FIG. 5b.

Variants or alternatives of the described embodiments of the foot prop may comprise an activation mechanism (not shown). The activation mechanism may be activated or disabled. When activated, the activation mechanism blocks the upper portion and lower portion against relative movement away from one another. That is, when activated, length adjustment of the elongate component, and, thus, of the foot prop, in either direction is not possible. When the activation mechanism is disabled, then the length adjustment mechanism works as described above in relation to the embodiments of FIGS. 1, 2*a*, 2*b*, 3*a*, and 3*b*. That is, when the activation mechanism is disabled, automatic length extension of the foot prop is allowed upon application of a force larger than a predetermined threshold on the lower portion, while shortening of the foot prop is precluded as long as the actuator is not operated.

The activation mechanism may be part of the length adjustment mechanism. It is, however, also possible that the activation mechanism is a component separate from or only partially integrated in the length adjustment mechanism.

For instance, with respect to the second embodiment, when activated, the activation mechanism may block the ratchet mechanism. This is, specifically, the engaging members 25 may be locked or blocked by the activation mechanism. This may prevent the engaging members 25 from disengaging from the receiving elements 29 even if a force B larger than the predetermined threshold is applied to the lower portion 12. Only upon disablement of the activation mechanism will it be possible for the engaging members 25 to disengage from the receiving elements 29, if a force B larger than the predetermined threshold is applied to the lower portion 12. Once the activation mechanism is disabled, the length adjustment mechanism 2 works as described above in relation to the second embodiment. In one variant, the disablement of the activation mechanism may be effected manually, in another variant, the disablement may be effected automatically.

The automatic disablement may be triggered by several events.

In one variant of the activation mechanism, it comprises a coupling between the rigid links, such as Isofix connectors, installed in a seat base of a child safety seat, and the length adjustment mechanism. According to this variant, the activation mechanism is activated as long as the rigid links are not correctly connected to the respective anchorage units of the vehicle. Upon correct connection of the rigid links to the respective anchorage units, the activation mechanism is disabled. The coupling between the rigid links of the seat base and the length adjustment mechanism could be provided by a flexible cable, e.g., a Bowden cable.

According to a second variant (which may be used in combination with or alternative to the first variant), the activation mechanism may comprise a sensing means, preferably an acceleration sensor, for sensing the forces exerted on the foot prop or on another component of the child safety seat. The activation mechanism may be disabled when the sensing means detects a force (or a quantity which is related to force) larger than a second predetermined threshold. In a preferred embodiment, the activation mechanism comprises, in addition to the sensing means, a control unit adapted to control the length adjustment mechanism. The control unit may be a mechanical or electronical device. As long as a force larger than the second predetermined threshold is detected by the sensing means, the control unit disables the activation mechanism. Once the detected force decreases below the second predetermined threshold, the activation mechanism is activated, again. The control unit preferably controls the ratchet mechanism of the second embodiment of the invention. As long as the activation mechanism is activated, the control unit blocks the ratchet mechanism such that the foot prop is prevented from length adjustment in either direction. Once the activation mechanism is disabled, the ratchet mechanism is released, and extension of the foot prop is allowed. By this, the length adjustment mechanism is triggered actively by the sensing means.

The activation mechanism may further comprise an expulsion mechanism. The expulsion mechanism is adapted to expel the lower portion away from the upper portion upon disablement of the activation mechanism. Such an expulsion mechanism may be realized by an elastic element, such as a spring, coupling the upper portion and the lower portion, and which is compressed as long as the activation mechanism is activated. Upon disablement of the activation mechanism, the spring may be released so that it is allowed to expand, thereby expelling the lower portion away from the upper portion.

The second predetermined threshold may be the same as the predetermined threshold for the lower portion. Preferably, the second predetermined threshold is, however, different from the predetermined threshold for the lower portion. Most preferably, the threshold for the lower portion is smaller than the force of gravity of the lower portion, and the second predetermined threshold is set to a value that is characteristic for forces arising in vehicle impacts. For this, it is preferable if the sensing means detects the forces exerted on the upper portion of the foot prop, thereby being sensitive to forces that act on the foot prop in addition to the force of gravity, when the foot prop is attached to a seat base of a child safety seat.

It is, however, also possible, that the sensing means detects the force exerted on the lower portion. This set-up is particularly advantageous because it allows for automatic extension of the foot only in the case of vehicle impacts. In another situation, e.g., during the transport or manufacturing of the foot propan unwanted extension under the force of gravity is suppressed. Since according to this variant the extension of the foot prop is actively triggered by the sensing means, it is advantageous if the activation mechanism of this variant may be manually disabled, e.g., by operating the actuator of the length adjustment mechanism. This allows for correct installation of a child safety seat with the foot prop in a vehicle (cf. also below with respect to FIGS. 4*a* and 4*b*).

Figure 4A:
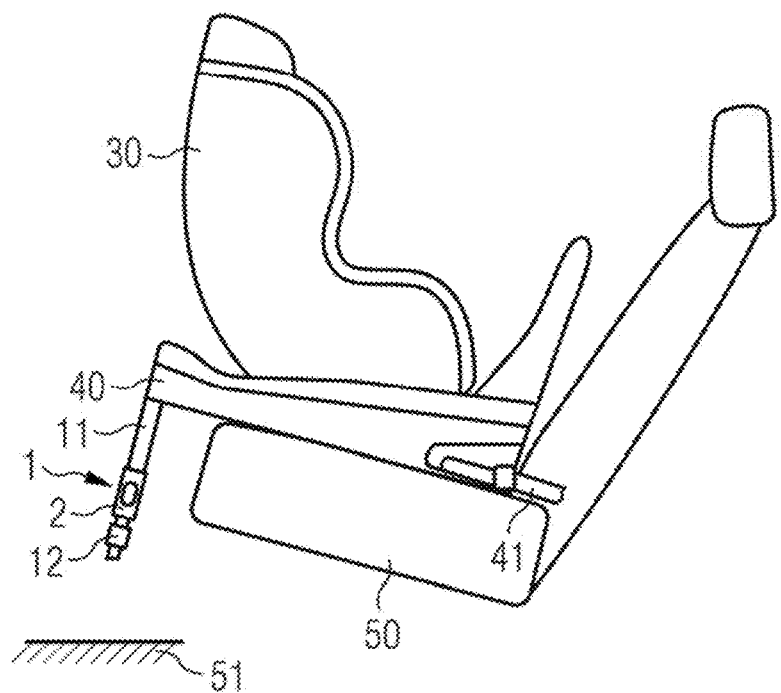
FIGS. 4a and 4b show a child safety seat in accordance with the invention comprising a seat base with an attached foot prop during the installation process of the child safety seat on the seat of a vehicle.
Figure 4B:
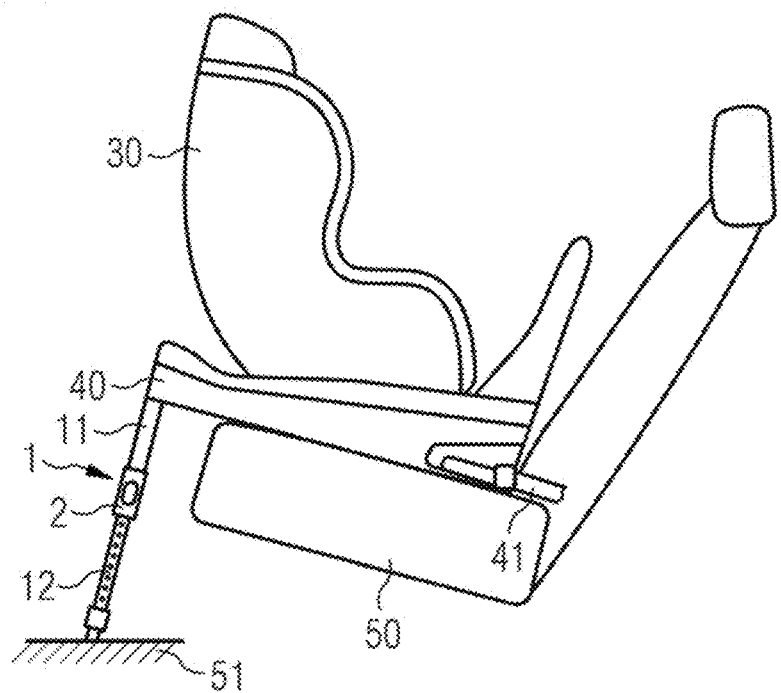

FIGS. 4*a* and 4*b* show the functioning of the foot prop 1 according to the invention during installation of a child safety seat 30 on a vehicle seat 50. In FIGS. 4*a* and 4*b* the child safety seat 30 comprises a seat base 40. The seat base 40 may be integrally formed with the child safety seat 30, or be a separate component. The foot prop 1 is attached to the seat base 40. In the shown Figures, the foot prop 1 is attached to the front side of the seat base 40. Preferably, the upper portion 11 of the foot prop 1 is pivotally attached to the seat base 40. The seat base 40 is placed on the vehicle seat 50. The seat base 40 comprises rigid links 41 each comprising a connector. The rigid links 41 with connectors comprise preferably Isofix connectors. The connectors are adapted to engage with respective anchorage units (not shown) of the vehicle.

FIG. 4*a* shows an early stage of the installation of the child safety seat 30 on the vehicle seat 50. In this case, the foot prop 1 has not yet been extended to the correct length. Under normal driving conditions, the correct length is given when the foot prop 1 touches the floor 51 of the vehicle. This is, however, not the case in FIG. 4*a*. The lower portion 12 of the foot prop 1 is substantially retracted so that there is a gap between the lower end of the foot prop 1 and the floor 51 of the vehicle.

FIG. 4*b* shows the foot prop 1 of the child safety seat 30 extended to the correct length. That is, in FIG. 4*b*, the lower portion 12 of the foot prop 1 is extended so as to touch the floor 51 of the vehicle.

Depending on the embodiment of the invention, the extension of the foot prop 1 to the correct length might be subject to several conditions.

First, the case is considered in which the predetermined threshold is set to a value smaller than the force of gravity of the lower portion 12, and in which no activation mechanism is employed. This is the most preferable embodiment. In this case, the length adjustment mechanism 2 allows for movement of the lower portion 12 away from the upper portion 11 of the foot prop as soon as the foot prop is placed in a substantially vertical position. In this case, the foot prop automatically extends to the correct length, i.e., until it touches the floor 51 of the vehicle. In other words, the force of gravity causes the lower portion 12 to automatically move away from the upper portion 11 until it reaches the floor of the vehicle.

Second, the case is considered with a predetermined threshold still set below the force of gravity of the lower portion 12 but with an activation mechanism used that is coupled to the rigid links 41 of the seat base 40 (cf. above after the description of FIG. 3b). In this case, the foot prop 1 is allowed to extend to the correct length only after the disablement of the activation mechanism. Given the activation mechanism comprising the coupling to the rigid links 41, the disablement occurs upon correct connection of the rigid links 41 to the respective anchorage units of the vehicle seat 50. Upon disablement of the activation mechanism, the lower portion 12 is automatically driven away from the upper portion 11 by the force of gravity until the lower portion 12 touches the floor 51 of the vehicle.

Third, the case is considered with a predetermined threshold still set below the force of gravity of the lower portion 12 but with an activation mechanism used that comprises a sensing means with a second threshold set to a value characteristic for vehicle impacts (cf. above after the description of FIG. 3b). In this case, the extension of the foot prop 1 is triggered by the sensing means. That is, only if the sensing means detects an external force applied to the foot prop 1 exceeding the second predetermined threshold will the lower portion 12 be allowed to automatically extend. Because of this, it might be necessary to manually disable the activation mechanism so as to allow the lower portion 12 to move away from the upper portion 11 until it touches the floor 51 of the vehicle. As described before, the activation mechanism of this variant is preferably manually disabled by operating the actuator of the length adjustment mechanism 2. Thus, by operating the actuator, the lower portion 12 is driven automatically by the force of gravity to the correct length.

Fourth, the case is considered with a predetermined threshold set above the force of gravity of the lower portion 12 and with no activation mechanism used. In this case, the extension of the foot prop 1 does not occur under normal conditions, since the force of gravity of the lower portion 12 is not sufficient for exceeding the predetermined threshold. In this case, the user might apply the additional force to the lower portion 12 by pulling on it. It is also possible, that the user operates the actuator of the length adjustment mechanism 2, which then allows for length adjustment of the foot prop 1.

FIG. 5a shows a child safety seat 30 with a seat base 40 placed on a vehicle seat 50 and a foot prop 1 attached to the seat base 40. The child safety seat 30 is secured to the vehicle by rigid links 41 comprising connectors, such as Isofix connectors, the connectors engaging with respective anchorage units of the vehicle. The foot prop 1 is correctly installed in FIG. 5a, that is, the foot prop 1 touches the floor 51 of the vehicle. FIG. 5a shows the correct placement of the child safety seat 30 under normal driving conditions.

FIG. 5b shows the functioning of the foot prop 1 in the case of a vehicle accident, specifically, in the case of a rear impact. The principal functioning of the foot prop 1 in the case of an accident is the same for all embodiments of the invention. They only use different triggers for providing the principal functioning. Because of this, the principal functioning will be first described. Thereafter, some aspects related to the different embodiments and triggers will be mentioned.

In FIG. 5b a force D is applied to the child safety seat 30 which typically occurs in rear-end collisions of a vehicle. The child safety seat 30 comprises a seat base 40. The seat base 40 is secured to the vehicle seat 50 by means of rigid links 41 comprising connectors, such as Isofix connectors. Although not visible in FIG. 5b, the connectors of the rigid links 41 engage with respective anchorage units of the vehicle seat 50. Furthermore, a foot prop 1 in accordance with the invention is attached to the seat base 40. The force D that might arise in a rear impact causes the child safety seat to rotate about the lateral axis defined by the connection point of the connectors of the rigid links 41 and the anchorage units. In FIG. 5b it is shown that the front part of the seat base 40 has risen/rotated with regard to the vehicle seat 50. Therefore, the position and orientation of the child safety seat 30 shown in the rear-impact scenario of FIG. 5b drastically differ from the normal-condition scenario shown in FIG. 5a. In accordance with the invention, the foot prop 1 is allowed to extend its length if a force larger than a predetermined threshold applies to the lower portion 12 of the foot prop 1. Because of this, in the case of a rear impact causing the child safety seat 30 to rise, and, thus, causing the upper portion 11 of the foot prop 1, which is attached to the seat base 40, to rise, the gap which would arise between the correct length of the foot prop 1 under normal conditions and the floor 51 of the vehicle is closed because the lower portion 12 of the foot prop 1 moves away from the upper portion 11 upon the rising/rotation of the latter. During the rising/rotation of the child safety seat 30 the lower portion 12 moves away from the upper portion 11 either until the lower portion 12 reaches the end stop (given by the maximal length of the elongate component), or until the lower portion 12 touches the floor 51 of the vehicle. Furthermore, still in accordance with the invention, the foot prop 1 is blocked against movement of the lower portion 12 towards the upper portion 11. In other words, the foot prop 1 is prevented from automatic shortening. Because of this, once the child safety seat 30, and, thus, the upper portion 11 of the foot prop 1 has reached the maximal height during the rear impact, the length of the foot prop 1 will be maintained. In other words, the length of the foot prop 1 is secured against retraction/shortening. Because of this, the child safety seat 30 is prevented from bouncing back/falling back down to the vehicle seat 50. Even if the foot prop 1 or, equivalently, its elongate component, were to reach the maximal length, the bouncing back/falling back of the child safety seat 30 would be still dramatically reduced.

As mentioned before, this principal functioning is the same for all embodiments in accordance with the invention. The triggers might, however, be different.

First, the case is considered in which the predetermined threshold is set to a value smaller than the force of gravity of the lower portion 12, and in which no activation mechanism is employed. That is, the trigger for this case is the force of gravity. In this case, the length adjustment mechanism 2 allows for automatic movement of the lower portion 12 away from the upper portion 11 of the foot prop as soon as the child safety seat 30 and the upper portion 11 start to rise/rotate in the case of a rear impact.

Second, the case is considered with a predetermined threshold set above the force of gravity of the lower portion 12 and with no activation mechanism used. In this case, the extension of the foot prop 1 does not occur by the force of gravity only. In this case, a contribution additional to the force of gravity is necessary for extending the foot prop 1. A strong enough rear impact might provide such an additional contribution. An impulse exerted on the foot prop during an impact in a rear-end collision is equivalent to an additional force of inertia affecting the lower portion 12. This additional force of inertia plus the force of gravity might then be larger than the predetermined threshold causing the extension of the length of the foot prop 1. The trigger for this case is, thus, the additional force of inertia.

Third, the case is considered with a predetermined threshold still set below the force of gravity of the lower portion 12 but with an activation mechanism used that comprises a sensing means with a second threshold set to a value characteristic for vehicle impacts. In this case, the extension of the foot prop 1 is triggered by the sensing means. When the sensing means detects an external force caused, e.g., by the rear impact exceeding the second predetermined threshold, the lower portion 12 will automatically extend subject to the force of gravity as long as the force of the impact exceeds the second predetermined threshold.

LIST OF REFERENCE NUMERALS 1 foot prop
10 elongate component
11 upper portion of the elongate component 10
12 lower portion of the elongate component 10
13 foot component of the foot prop 1
2 length adjustment mechanism
21 teeth of the length adjustment mechanism 2
22 holes of the lower portion 12 for engaging with the teeth 21
23 housing of the length adjustment mechanism 2
24 metal brackets
25 engaging members/ratchets
26 pins
27 actuator/button
28 elastic elements/springs
29 receiving elements/holes of the lower portion 12 for engaging with the ratchets 25
111 flange of the upper portion 11
121 flange of the lower portion 12
3 attachment means
30 child safety seat
40 seat base
41 rigid links of the seat base
50 seat of a vehicle
51 floor of a vehicle
F force applied to the lower portion 12
Fth predetermined threshold
A arrow indicating attempted movement of lower portion 12 towards upper portion 11
B arrow indicating movement of lower portion 12 away from upper portion 11
C arrows indicating the movement of the engaging members 25 out of engagement with the receiving elements 29
D arrow indicating the force exerted on the child safety seat 30 in a rear impact

The invention claimed is:

1. Foot prop adapted to be attached to a child safety seat, comprising:
   an elongate component extendable between a minimal length and a maximal length, the elongate component comprising:
   an upper portion and
   a lower portion,
   wherein the lower portion is slidable relative to the upper portion in longitudinal direction of the elongate component to move between the minimal length and the maximal length;
   wherein the lower portion is configured to automatically move in a direction away from the upper portion in response to a force being applied to the lower portion in the longitudinal direction exceeding a predetermined threshold, thereby increasing a length of the elongate component; and
   wherein the lower portion is releasably blocked against movement toward the upper portion.

2. The foot prop according to claim 1, wherein the predetermined threshold is smaller than the force of gravity.

3. The foot prop according to claim 1, further comprising a length adjustment mechanism having an actuator operable to adjust the length of the elongate component, and in response to the actuator being operated, the lower portion is configured to move toward the upper portion, and in response to the actuator not being operated, the lower portion is blocked against moving toward the upper portion.

4. The foot prop according to claim 3, wherein the length adjustment mechanism comprises a ratchet mechanism coupled to either one of the upper portion or the lower portion of the elongate component, wherein the ratchet mechanism is adapted to engage with a receiving element of the other one of the lower portion or the upper portion of the elongate component.

5. The foot prop according to claim 4, wherein the ratchet mechanism comprises an engaging member, wherein the receiving element is adapted to receive at least a portion of the engaging member, and wherein the length adjustment mechanism is configured such that the engaging member is forced into the receiving element upon lower portion moving toward the upper portion.

6. The foot prop according to claim 1, further comprising an activation mechanism, the activation mechanism being configured to block the lower portion from automatically moving in the direction away from the upper response in response to being activated; and
   wherein the activation mechanism is configured, to allow the lower portion to automatically move in a direction away from the upper portion in response to being disabled.

7. The foot prop according to claim 6, further comprising a sensing means coupled to the activation mechanism and adapted to sense the force exerted on the foot prop or on another component of the child safety seat, wherein the sensing means is configured to sense the force being applied in the longitudinal direction to the lower portion, and in response to the force exceeding the predetermined threshold, cause the disablement of the activation mechanism.

8. Seat base for a child safety seat comprising a foot prop, the foot prop comprising:
   an elongate component extendable between a minimal length and a maximal length, the elongate component comprising:
   an upper portion and
   a lower portion, wherein the lower portion is slidable relative to the upper portion in longitudinal direction of the elongate component to move between the minimal length and the maximal length;

wherein the foot portion is configured to automatically move in a direction away from the upper portion in response to a force being applied to the lower portion in the longitudinal direction exceeding a predetermined threshold, thereby increasing a length of the elongate component; and wherein the lower portion is releasably blocked against movement toward the upper portion.

9. The seat base according to claim 8, wherein the upper portion of the elongate component is pivotally attached to the seat base.

10. The seat base according to claim 8, further comprising a pair of rigid links projecting from the seat base, each of the rigid links having a releasable connector and being adapted to be engaged with respective anchorage units provided in a vehicle.

11. Child safety seat comprising a foot prop, the foot prop comprising:

an elongate component extendable between a minimal length and a maximal length, the elongate component comprising:

an upper portion and a lower portion, wherein the lower portion is slidable relative to the upper portion in longitudinal direction of the elongate component to move between the minimal length and the maximal length;

wherein the lower portion is configured to automatically move in a direction away from the upper portion in response to a force being applied to the lower portion in the longitudinal direction exceeding a predetermined threshold, thereby increasing a length of the elongate component and wherein the lower portion is releasably blocked against movement toward the upper portion.

12. Child safety seat comprising a foot prop, wherein the foot prop comprises:

an elongate component extendable between a minimal length and a maximal length and comprising an upper portion and a lower portion, wherein the lower portion is slidable relative to the upper portion in longitudinal direction of the elongate component to move between the minimal length and the maximal length;

wherein the lower portion is configured to automatically move in a direction away from the upper portion, so that the length of the elongate component is increased, in response to an impact during a collision of the vehicle causes causing the child safety seat to rise from the seat of a vehicle to which the child safety seat is installed.

13. The child safety seat according to claim 12, wherein the lower portion is releasably blocked against relative movement toward the upper portion.

14. Child safety seat according to claim 12, wherein the child safety seat comprises a seat shell configured to be operably coupled to a seat base, wherein the foot prop is coupled to the seat base.

* * * * *